(12) United States Patent
Lindoff et al.

(10) Patent No.: US 12,071,035 B2
(45) Date of Patent: *Aug. 27, 2024

(54) HANDLING SURPLUS AND/OR DEFICIT OF ENERGY IN LOCAL ENERGY SYSTEMS

(71) Applicant: E.ON SVERIGE AB, Malmo (SE)

(72) Inventors: Bengt Lindoff, Bjarred (SE); Jacob Skogstrom, Lomma (SE); Per Rosen, Lund (SE)

(73) Assignee: E.ON SVERIGE AB, Malmo (SE)

( * ) Notice: Subject to any disclaimer, the term of this patent is extended or adjusted under 35 U.S.C. 154(b) by 794 days.

This patent is subject to a terminal disclaimer.

(21) Appl. No.: 17/052,143

(22) PCT Filed: Apr. 26, 2019

(86) PCT No.: PCT/EP2019/060768
§ 371 (c)(1),
(2) Date: Oct. 30, 2020

(87) PCT Pub. No.: WO2019/211199
PCT Pub. Date: Nov. 7, 2019

(65) Prior Publication Data
US 2021/0114479 A1 Apr. 22, 2021

(30) Foreign Application Priority Data
Apr. 30, 2018 (EP) .................................. 18170083

(51) Int. Cl.
*B60L 53/63* (2019.01)
*B60L 55/00* (2019.01)
(Continued)

(52) U.S. Cl.
CPC ............... *B60L 53/63* (2019.02); *B60L 55/00* (2019.02); *H02J 3/322* (2020.01); *H02J 3/381* (2013.01);
(Continued)

(58) Field of Classification Search
CPC .... B60L 53/63; B60L 53/50–57; B60L 55/00; H02J 13/00004
See application file for complete search history.

(56) References Cited

U.S. PATENT DOCUMENTS

| 2009/0313103 A1 | 12/2009 | Ambrosio et al. |
| 2010/0194205 A1 | 8/2010 | Tokunaga et al. |

(Continued)

FOREIGN PATENT DOCUMENTS

| DE | 102015201810 | 8/2016 |
| DE | 102016212026 | 1/2018 |

(Continued)

OTHER PUBLICATIONS

Machine translation of DE-102017113845-A1 (Year: 2023).*

(Continued)

*Primary Examiner* — David V Henze-Gongola
(74) *Attorney, Agent, or Firm* — Knobbe, Martens, Olson & Bear, LLP

(57) ABSTRACT

A method for handling surplus or deficit of energy in a local energy system (30) is presented. The method comprising: determining (S1) energy status of the local energy system (30) based on data pertaining to the local energy system (30); determining (S2), for each of a plurality of moveable devices (10) comprising an accumulator (20), an accumulator status based on accumulator data pertaining to the respective moveable device (10); scoring (S3), based on the determined respective accumulator statuses and the determined energy status, each of the moveable devices (10); and selecting (S4), based on the respective scores of each of the plurality of moveable devices (10), a moveable device (10) among the plurality of moveable devices (10) to which at least one of control information or navigational information associated to the local energy system (30) is to be sent; and sending the control information and/or the navigational (Continued)

information to the selected moveable device (10). Also a server (40) configured to handling surplus or deficit of energy in a local energy system is presented.

10 Claims, 3 Drawing Sheets

(51) Int. Cl.
  *H02J 3/32* (2006.01)
  *H02J 3/38* (2006.01)
  *H02J 7/00* (2006.01)
  *H02J 13/00* (2006.01)
(52) U.S. Cl.
  CPC ....... *H02J 7/0048* (2020.01); *H02J 13/00004* (2020.01); *H02J 2300/20* (2020.01); *H02J 2300/22* (2020.01); *H02J 2310/48* (2020.01)

(56) References Cited

U.S. PATENT DOCUMENTS

| | | | |
|---|---|---|---|
| 2011/0276194 | A1 | 11/2011 | Emalfarb et al. |
| 2012/0245750 | A1 | 9/2012 | Kumar et al. |
| 2012/0249068 | A1* | 10/2012 | Ishida ..................... B60L 55/00 320/109 |
| 2015/0295565 | A1 | 10/2015 | Maeda et al. |
| 2015/0298565 | A1 | 10/2015 | Iwamura et al. |
| 2015/0345962 | A1* | 12/2015 | Graham ............... G06Q 10/047 701/423 |
| 2016/0221453 | A1 | 8/2016 | Bridges et al. |
| 2016/0280089 | A1 | 9/2016 | Uyeki et al. |
| 2017/0259683 | A1* | 9/2017 | Shimizu .................. B60L 53/63 |
| 2020/0276910 | A1* | 9/2020 | Harty ..................... B60L 55/00 |
| 2021/0213848 | A1* | 7/2021 | Sun ........................ G06Q 10/02 |
| 2021/0245617 | A1* | 8/2021 | Lindoff ............. H02J 13/00002 |

FOREIGN PATENT DOCUMENTS

| | | |
|---|---|---|
| DE | 102017113845 A1 * | 12/2018 |
| JP | 2011-197932 A | 10/2011 |
| JP | 2012-205425 A | 10/2012 |
| JP | 2012048286 | 3/2013 |
| JP | WO2014/033944 | 8/2016 |
| WO | WO 2014/146727 | 9/2014 |
| WO | WO 2017076868 | 5/2017 |

OTHER PUBLICATIONS

International Search Report and Written Opinion of PCT/EP2019060768, dates Apr. 6, 2018, in 12 pages.
International Search Report and Written Opinion of PCT/EP2019/060719, dated Jun. 4, 2019, in 12 pages.

* cited by examiner

HANDLING SURPLUS AND/OR DEFICIT OF ENERGY IN LOCAL ENERGY SYSTEMS

FIELD OF INVENTION

The invention relates to handling surplus and/or deficit of energy in a local energy system.

The invention also relates to a server configured to handle surplus and/or deficit of energy in a local energy system.

TECHNICAL BACKGROUND

Increasingly, electrical energy is generated in local energy systems. Examples of local energy systems are solar panels and windmills. Such local energy systems will increase the power production variations over time, not only season wise, but also over the day. This for example due to the variations of sun and wind. Due to the variations, sometimes there will be a surplus of energy at a specific local energy system and sometimes there will be a deficit of energy at that specific local energy system. Further, moveable devices comprising an accumulator, such as an electric vehicle, may also be seen as a local energy system. Also a local energy system in the form of a moveable device comprising an accumulator may sometimes comprise a surplus of energy and sometimes there will be a deficit of energy. Thus, there exists a need for handling surplus or deficit of energy in a local energy system.

SUMMARY OF INVENTION

In view of the above, it is an object of the present invention to provide means for handling surplus or deficit of energy in a local energy system.

According to a first aspect a method for handling surplus or deficit of energy in a local energy system is provided. The method comprising:

determining energy status of the local energy system based on data pertaining to the local energy system;

determining, for each of a plurality of moveable devices comprising an accumulator, an accumulator status based on accumulator data pertaining to the respective moveable device;

scoring, based on the determined respective accumulator status and the determined energy status, each of the moveable devices;

selecting, based on the respective scores of each of the plurality of moveable devices, a moveable device among the plurality of moveable devices to which at least one of control information or navigational information associated to the local energy system is to be sent; and sending the control information and/or the navigational information to the selected moveable device.

In connection with the present disclosure the term "energy status of the local energy system" is to be understood as a status of a local energy system in connection with energy, i.e. if the local energy system is in need of energy or has excess energy available. Possibly the energy status of the local energy system is also indicative of how much energy is needed or available. Possibly the energy status of the local energy system is also indicative of when the energy is needed or available.

In connection with the present disclosure the term "accumulator status" is to be understood as a status of an accumulator in connection with energy, i.e. if the accumulator is in need of energy or has excess energy available. Possibly, the status of the accumulator is also indicative of a current state of charge of the accumulator together with a minimum and/or a maximum state of charge of the accumulator. Possibly, the status of the accumulator is also indicative of a desired state of charge of the accumulator Possibly, e status of the accumulator is also indicative of a point in time when the desired state of charge is to be reached.

In this way, a moveable device may be selected to be directed to and recharge at the local energy system currently experiencing a surplus of generated energy. Moveable devices traditionally being powered by burning fossil fuel in an engine are increasingly, instead or in addition, being powered by electrical motors. Hence, the moveable device may be propelled by an electric motor. Non-limiting examples of such movable devises are cars, busses, trucks, drones, robots, lawn mowers, boats, airplanes, and helicopters. The energy for powering the electrical motor is typically stored in an accumulator of the moveable device. According to a non-limiting example, the accumulator may be a battery. The battery may electrochemically store electrical power. According to a non-limiting example, the accumulator may be a hydrogen tank. The hydrogen tank may store hydrogen that later may be transformed into electrical power at a fuel cell. Similarly, if the local energy system is currently experiencing a deficit, i.e. not generating enough energy for some reason, a moveable device may be directed to and discharge some energy to the local energy system. In this way, local energy systems can handle an excess or deficit of energy by utilizing activity of moveable devices in their area, synergizing with these moveable devices' expected behavior to stop for charging or other reasons. By matching the accumulator status, and possibly other needs, of a moveable device towards current local energy system needs, energy supply and demand may be matched on a local scale. This may reduce the need for stationary accumulators at the local energy system. Such stationary accumulators at the local energy system would otherwise be needed in order to store surplus energy in times of surplus energy production at the local energy system to be used at times of deficit in the energy production at the local energy system.

According to a specific example the act of selecting comprises selecting a moveable device among the plurality of moveable devices to which control information associated to the local energy system is to be sent and the act of sending comprises sending the control information to the selected moveable device. According to such example the selected moveable device may already be present at the local energy system. According to this example, the local energy system may be a moveable device parked at a parking place. The local energy system in the form a moveable device may be in need of energy. The selected moveable device may be one of one or more moveable devices also parked at the same parking place. The selected moveable device may hence share excess energy to the local energy system in the form of a moveable device. The local energy system in the form a moveable device may have an excess of energy. The selected moveable device may be one of one or more moveable devices also parked at the same parking place. The selected moveable device may hence get excess energy from the local energy system in the form of a moveable device. Hence, a set of movable devices may be parked at a parking place, and the method may be used for deciding which one of the devices to charge/discharge depending on needs of the moveable devices, wherein one of the moveable devices is to be seen as the local energy system. The selected moveable device and the local energy system may be connected to each other at a local charging/discharging system of the parking place.

The accumulator data may comprise a current state of charge of the accumulator, a minimum state of charge of the accumulator, and/or a maximum state of charge of the accumulator. Including a maximum state of charge, a minimum state of charge and/or a current state of charge may enable a more informed estimation of the needs of the moveable device vis-a-vis those of the local energy system.

The accumulator data may comprise a desired state of charge of the accumulator. In this way, the moveable device may charge or discharge as needed at the local energy system while still enabling the accumulator to have a desired state of charge when the moveable device is again activated for movement. For instance, it may be known that a typical usage of a moveable device only requires a portion, e.g. half, of the available maximum capacity of the accumulator. The moveable device may hence discharge any energy in excess of this portion to the local energy system in need of energy. By knowing desired state of charge, a better match implying a better match of energy supply and demand between the movable device and the local energy systems may be found. In this way less overall energy may be wasted.

The desired state of charge may comprise an interval of states of charge. In this way, the moveable device may charge/discharge to a point within its desired state-of-charge interval chosen such that needs of the local energy system providing/absorbing the energy are more closely met. Thus, the needs of a local energy system may be more optimally weighed against the needs of the moveable device.

The act of scoring each of the movable devices may comprise estimating an energy cost for moving the movable device to the local energy system. The act of moving the moveable device refers to transporting the moveable device to the respective local energy system. The act of moving may comprise one or more of driving, flying, propelling, or any other active way of transporting the moveable device to the respective local energy system. For example, in this way, moveable devices which would not be able to reach the local energy system may be disqualified from consideration. Further, moveable devices which are in reach of the local energy system but which are so close that the accumulator of the moveable device would not charge enough for a stop to be efficient might similarly be disqualified from consideration. Furthermore, the time to be spent at the local energy system by the charging/discharging moveable device may be more closely optimized to the needs of the moveable device.

The data pertaining to the accumulator may comprise a desired time of operation of the moveable device comprising the accumulator. The desired time of operation may comprise a start time of the time of operation. The desired time of operation may comprise an end time of the time of operation. The start time of operation may be expressed as a departure time from the local energy system. For example, an electric vehicle may want to leave a local energy system when the owner of the electric vehicle returns e.g. after work.

Further, the act of scoring each of the local energy systems may comprise a desired arrival time of the movable device to the respective local energy system.

The data pertaining to the local energy system may pertain to an amount of energy available for transfer from the local energy system. This allows for selection of moveable devices which may be in greater need of a charging energy. Conversely, it may dissuade from directing a moveable device having a state of charge above its desired level to a local energy system needing to get rid of energy. The data pertaining to the local energy system may pertain to a time period of availability of the energy. This enables more informed planning of charging/discharging activities of moveable devices. For instance, a local energy system based on solar panels may not be suitable for charging activities at night. The time period of availability may be measured on a scale of hours or part of a day.

The data pertaining to the local energy system may pertain to an energy need of the local energy system, i.e. an amount of energy needed at the local energy system. This allows for selection of moveable device having a state of charge being higher than needed, which may be able to discharge energy to the local energy system being in need of energy. The data pertaining to the local energy system may pertain to a time period of the need of the energy.

By knowing a current excess or deficit of energy in the local energy system, a better match of energy supply and demand between the plurality of movable devices and the local energy system may be made. In this way less overall energy may be wasted.

The method may further comprise directing the selected movable device to the local energy system.

The local energy system may be associated with a geographical position. The current positon of the plurality of moveable devices may be determined. This may e.g. be made using a GPS-unit.

The method may further comprise determining navigational data pertaining to the geographical position of the local energy system and to a current geographical position of one or more of the movable devices. The act of directing the selected movable device may comprises providing the navigational data to a navigator of the selected movable device. This enables navigation of the moveable device to the local energy system. This may be necessary in order for autonomous moveable devices to ambulate to a local energy system, and/or helpful for a human operator.

The local energy system may comprise one or more of the following: a solar panel, a wind turbine, a thermal energy generator, another moveable device comprising an accumulator, a district heating system, a district cooling system or a shared heating and cooling thermal system, such that Ectogrid™, see e.g. WO 2017/076868. The local energy system may be a solar panel park comprising a set of solar panels. The local energy system may be a wind turbine park comprising a set of wind turbines. A local energy system is to be seen as an energy system that is locally producing and/or locally using energy. In this context locally shall be construed as being within a limited space. For example, a local energy system may be arranged in a vehicle, in house, in a block of houses or in a district of a city. According to a non-limiting example, a local energy system is an energy system that is configured to mainly produce energy locally and to locally consume the locally produced energy. Hence, the produced energy is preferably consumed at the same place as it is produced. However, at some time instances such a local energy system may need extra energy or may need to get rid of excess energy. The present invention provides means for this.

The method may further comprise identifying the plurality of moveable devices as being moveable devices being presently located within a predetermined geographical area According to a second aspect a server configured to handle surplus or deficit of energy in a local energy system is provided. The server comprising:

a receiver configured to receive data pertaining to the local energy system and to receive accumulator data pertaining to a plurality of moveable devices each comprising an accumulator, and a control circuit configured to:

determine, using a local energy system status determining function, an energy status of the local energy system, wherein the energy status is based on the data pertaining to the local energy system;

determine, using an accumulator determining function, an accumulator status for each of the moveable devices, wherein the accumulator status for each moveable device is based on the accumulator data of the respective moveable device;

score, using a scoring function, each of the moveable devices, wherein each score is based on the respective determined accumulator status and the determined energy status; and select, using the scoring function, a moveable device among the plurality of moveable devices to which at least one of control information or navigational information associated to the local energy system is to be sent;

wherein the receiver is further configured to send the control information and/or navigational information associated to the local energy system to the selected moveable device.

Such a server may enable for moveable devices passing through an area to be placed in contact with the server and use a local energy system in the area to regulate their energy needs as described in connection with the method according to the first aspect.

The above mentioned features of the method, when applicable, apply to this second aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions may be exaggerated for illustrative purposes and, thus, are provided to illustrate the general structures of embodiments of the present invention. Like reference numerals refer to like elements throughout.

DETAILED DESCRIPTION OF PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
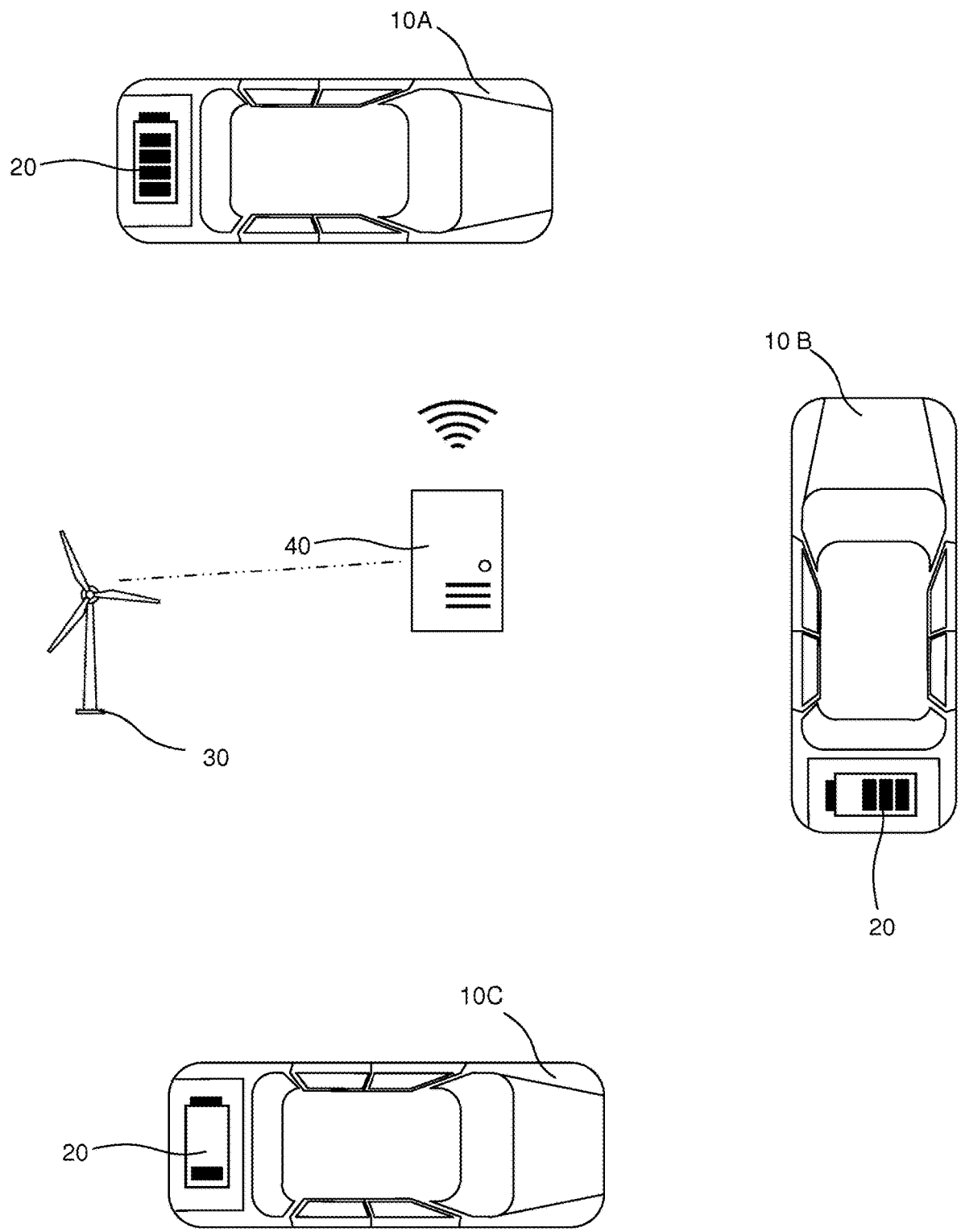
FIG. 1 illustrates a plurality of moveable devices, a server and a local energy system interconnected in a communication network.

FIG. 1 illustrates a communication network comprising a plurality of moveable devices 10A, 10B, 10C, a local energy system 30, and a server 40. The moveable devices 10 A, 10B, 10C, the local energy system 30, and the server 40 are configured to communicate with each other. The communication is preferably wireless communication. Such communication is well known to a person skilled in the art and will not be described in any detail herein.

Each of the moveable devices 10A, 10B, 10C is in this case illustrated as an electric car. The electric car is just an example of a moveable device 10. The moveable device 10 may be any device configured to be propelled by an electric motor. Further, non-limiting examples of moveable devices are: busses, trucks, drones, robots, lawn mowers, boats, airplanes, and helicopters. The energy for powering the electrical motor is typically stored in an accumulator 20 of the moveable device 10. According to a non-limiting example, the accumulator 20 may be a battery. The battery may electrochemically store electrical power. According to another non-limiting example, the accumulator may be a hydrogen tank storing hydrogen. The hydrogen may later be transformed into electrical power at a fuel cell. Hence, the accumulator 20 may hold electric power which the moveable device 10 can use for different purposes, such as propelling the moveable device. Further, the accumulator 20 may be configured to be discharged at a local energy system. Many moveable devices comprise accumulators with quite some capacity. For example, electric cars out on the market today may comprise a battery with a capacity in the order of 40-120 kWh. This may be well enough as a backup supply for a local energy system for hours or even days. Especially since some of the electric cars except from having the ability to charge their accumulators also have the ability to discharge their accumulators. The later may be referred to a Vehicular to Grid (V2G) system. Hence, a moveable device 10 comprising a V2G system may not only charge the on board accumulator 20 but also discharge it to a local energy system. Hence, the on board accumulator 20 of the moveable device 10 may be used as back-up accumulator for the local energy system. When not referring to a specific moveable device 10A, 10B, 10C, the term "moveable device 10" will be used throughout the specification. Each moveable device 10 may be associated with a current geographical position. For this each movable device 10 may be equipped with a GPS-unit.

The local energy system 30 is depicted as a wind turbine. It is realized that the local energy system 30 alternatively may be a solar panel, a thermal energy generator, a district heating system, a district cooling system, a shared heating and cooling systems, or any other system of local generation of energy. The local energy system 30 may even be another moveable device 10 having an accumulator 20. The local energy system 30 may be associated with a geographical position. The geographical position is the position where energy may be extracted from or inputted to the local energy system 30. The local energy system 30 may comprise an accumulator. The local energy system 30 need not comprise an accumulator, but may instead generate energy, e.g. electricity, only when connected to an energy-consuming device, such as a moveable device 10 or any other kind of energy-consuming device. Excess energy of the local energy system 30 may be stored at an accumulator connected to the local energy system 30. The accumulator connected to the local energy system 30 may be a stationary accumulator belonging to the local energy system. Alternatively, or in combination, the accumulator connected to the local energy system 30 may be an accumulator of a movable device 10 connected to the local energy system 30.

Due to the potential large fluctuations of energy productions in the local energy system, accumulator may be needed. Designing stationary accumulators for worst case scenarios at each local energy system is associated to a cost increasing the overall cost for energy systems. Hence, the V2G system may be possible to use for mitigating the problem that some local energy system has excess and other a deficit of energy at a certain time instant.

Figure 2:
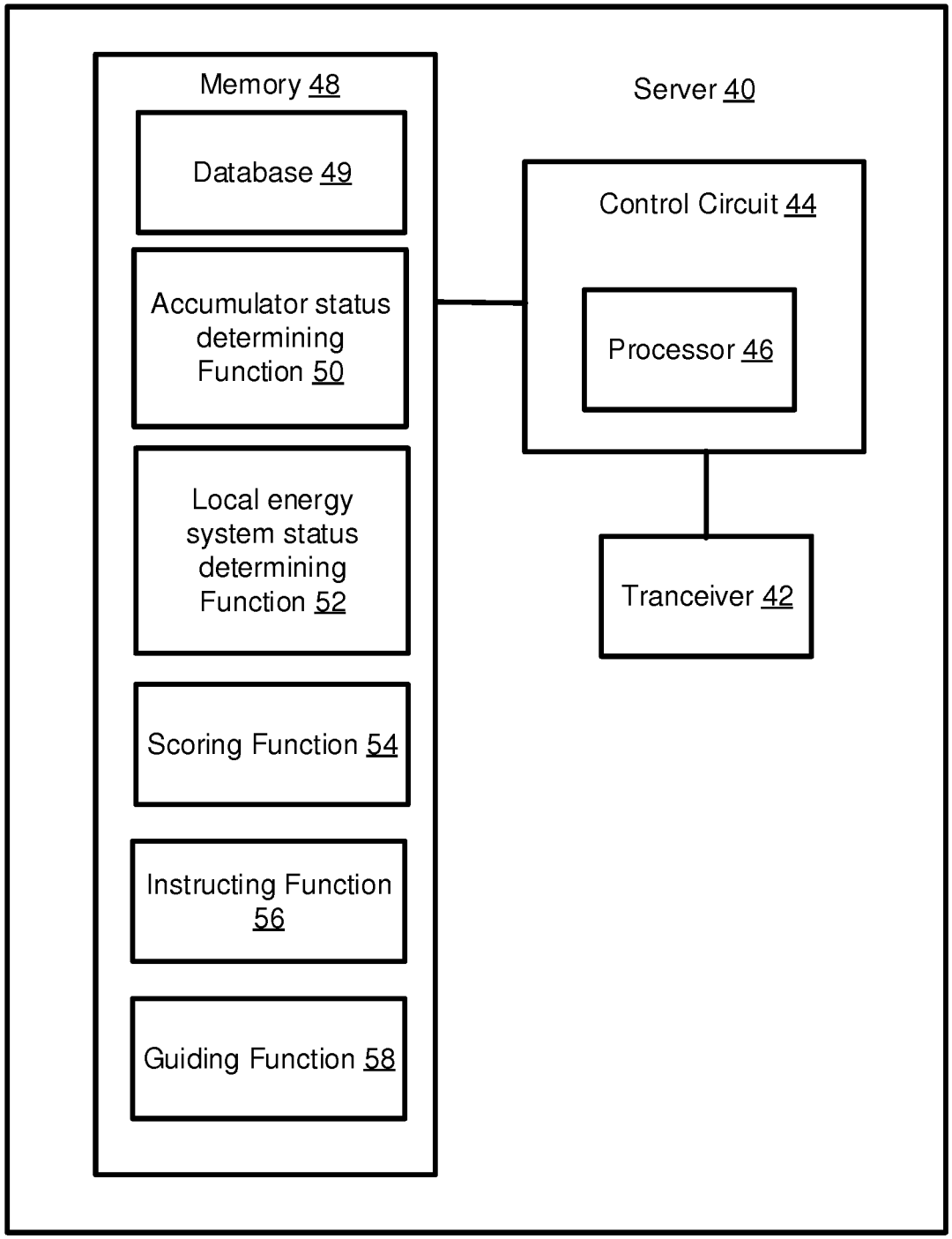
FIG. 2 is a schematic of a server.

A more detailed schematic of the server 40 is schematically shown in connection with FIG. 2. The server 40 comprises a transceiver 42, a control circuit 44 and a memory 48.

The transceiver 42 is configured to communicate individually with the plurality of movable devices 10. The transceiver 42 is configured to communicate with the local energy system 30. Hence, the transceiver 42 enables the server 40 to establish communications with other device, such as the movable devices 10 and the local energy system 30. That said, the local energy system 30 and each of the plurality of movable devices 10 also comprises a respective transceiver for communicating with the server 40. The communications may include data transfers, and the like. Data transfers may include, but are not limited to, downloading and/or uploading data and receiving or sending messages. The data may be processed by the server 40, each of the plurality of movable devices 10 and/or the local energy system 30. The processing may include storing the data in a memory, e.g. the memory 48 of the server 40, executing operations or function, and so forth.

The control circuit 44 is configured to carry out overall control of functions and operations of the server 40. The control circuit 44 may include a processor 46, such as a central processing unit (CPU), microcontroller, or microprocessor. The processor 46 is configured to execute program code stored in the memory 48, in order to carry out functions and operations of the server 40.

The memory 48 may be one or more of a buffer, a flash memory, a hard drive, a removable media, a volatile memory, a non-volatile memory, a random access memory (RAM), or another suitable device. In a typical arrangement, the memory 48 may include a non-volatile memory for long term data storage and a volatile memory that functions as system memory for the control circuit 48. The memory 48 may exchange data with the control circuit 44 over a data bus. Accompanying control lines and an address bus between the memory 48 and the control circuit 44 also may be present.

Functions and operations of the server 40 may be embodied in the form of executable logic routines (e.g., lines of code, software programs, etc.) that are stored on a non-transitory computer readable medium (e.g., the memory 48) of the server 40 and are executed by the control circuit 44 (e.g., using the processor 46). Furthermore, the functions and operations of the server 40 may be a stand-alone software application or form a part of a software application that carries out additional tasks related to the server 40. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The control circuit 44 may execute an accumulator status determining function 50. The accumulator status determining function 50 may be configured to determine an accumulator status of the accumulator 20 of a moveable device 10. The accumulator status determining function 50 may be configured to determine the accumulator status based on one or more of the following accumulator data pertaining to the accumulator 20 of the moveable device 10:

a current state-of-charge (SOC) of the accumulator 20;

a maximum or minimum SOC possible for the accumulator 20;

a voltage tolerance when charging the accumulator 20;

a geographical area the moveable device 10 request to park on, for instance within certain blocks, urban district, suburbs, etc.;

an accumulator size, e.g. measured in kWh;

an indication whether the accumulator is required for be charged, if the SOC is low, for instance below 10%; and an indication whether the accumulator is allowed to be discharged, and in that case, possibly also an indication about how much discharge that is allowed, for example down to a SOC of 60%.

One of more of the above accumulator data pertaining to the accumulator 20 for the moveable device 10 may be retrieved from the moveable device 10. For example, the current SOC of the accumulator 20. Alternatively, or in addition, one of more of the above accumulator data pertaining to the accumulator 20 for the moveable device 10 may be stored in a database 49 stored in the memory 48. For example, the maximum or minimum SOC possible for the accumulator 20 or the voltage tolerance when charging the accumulator 20. Each entry of the database may be linked to an ID for the accumulator 20 and/or for the moveable device 10. The ID for the accumulator may be an ID for a specific type of accumulator 20. The ID for the accumulator may be an ID unique for each specific accumulator 20. The ID for the moveable device 10 may be an ID for a specific type of moveable device 10. The ID for the moveable device 10 may be an ID unique for each specific moveable device 10. The database 49 does not need to be stored locally at the server 40. Hence, the database 49 may e.g. be a distributed database compiled using cloud computing. One of more of the above accumulator data pertaining to the accumulator 20 may be measured in real-time. One of more of the above accumulator data pertaining to the accumulator 20 may be predetermined. The accumulator status of the accumulator 20 of the moveable device 10 may be an indication of need for the accumulator 20 to be charged or for the accumulator 20 to get rid of energy.

The accumulator status may also be based on additional information. For example, a price level, i.e. maximum allowed price for charging the accumulator, or request for negative price in case of discharge. The additional information may also comprise a request including a time aspect, i.e. of type "at time X, the SOC need to be at least Y".

The control circuit 44 may execute a local energy system status determining function 52. The local energy system energy status determining function 52 may be configured to determine an energy status of the local energy system 30. The local energy system energy status determining function 52 may be configured to determine the energy status of a local energy system 30 based on one or more of the following data pertaining to the local energy system 30:

a location (geographical position) of the local energy system;

information pertaining to excess or deficit of energy and possible also a measure of how large the excess or deficit of energy is;

information pertaining to when the energy is available or needed and for how long:

a price offer (price per kWh), such a price offer may be negative or positive depending excess or deficit of energy;

a current capacity to accommodate moveable devices 10;

a minimum/maximum charging power; and a time of availability of the local energy system 30—for instance, the local energy system 30 may be housed in a parking garage with closing hours.

One of more of the above data pertaining to the local energy system 30 may be retrieved from the local energy system 30. For example, information pertaining to excess or deficit of energy and possible also a measure of how large the excess or deficit of energy is; information pertaining to when the energy is available or needed and for how long; the price offer (price per kWh), such a price offer may be negative or positive depending excess or deficit of energy; or the current capacity to accommodate moveable devices 10. Alternatively, or in addition, one of more of the above data pertaining to the local energy system 30 may be stored in the database 49. For example, the minimum/maximum charging power; or the time of availability of the local energy system 30. Each entry of the database 49 may be linked to an ID for the local energy system 30. One of more of the above data pertaining to the local energy system 30 may be measured in real-time. One of more of the above data pertaining to the local energy system 30 may be pre-determined. The energy status of each one of the plurality of local energy systems 30 may be an indication of a need for the local energy system 30 to get rid of energy or a need for the local energy system 30 to get energy. In particular, the energy status of the local energy system 30 may comprise an amount of energy available for transfer to one or more moveable devices 10 or an amount of energy needed by the local energy system 30.

The control circuit 44 may execute a scoring function 54. The scoring function 54 may be configured to select a moveable device 10 among the plurality of moveable devices 10 to which at least one of control information or navigational information associated to the local energy system 30 is to be sent. The control information associated to the local energy system 30 is information pertaining to how to control the selected moveable device 10 in connection with the local energy system 30. The control information may be information pertaining to how to charge/discharge energy to/from the accumulator 20 of the selected moveable device 10 from/to the local energy system 30. The navigational information associated to the local energy system 30 is information pertaining how to guide the selected moveable device 10 to the local energy system 30. The navigational information may be based on a geographical position of the local energy system 30 and a geographical position of the selected moveable device 10. The scoring function 54 may base the selection of one of the plurality of moveable devices 10 based on a scoring. The scoring may be configured to compare the energy status of the local energy system 30 and the accumulator statuses of the moveable devices 10. The scoring may further be based on other data such as pre-set preferences. The scoring will be discussed in more detail below and will also be exemplified with some examples. The scoring function 54 may further comprise a comparator. The comparator is configured to compare the scores and select at least one movable device 10 based on the scores. The comparator may be configured to select one specific moveable device 10 having e.g. the best score. The comparator may be configured to select a sub-set of moveable devices 10 having scores above a threshold.

The control circuit 44 may execute an instruction function 56. The instructing function 56 may be configured to send the control information associated to the local energy system 30 or navigational information associated to the local energy system 30 to the determined moveable device 10. The receiver of the control information may be a charger/discharger at the moveable device 10. Alternatively, or in combination, the instruction function 56 may be configured to send the control information associated to the local energy system 30. The receiver of the control information may be a charger/discharger at the local energy system 30.

As mentioned above, the navigational information associated to the local energy system 30 comprises information pertaining to how to guide the selected moveable device 10 to the local energy system 30. The navigational information may comprise information pertaining to the geographical position to the local energy system 30. The information pertaining to the geographical position to the local energy system 30 may comprise an identifier of the local energy system 30 and/or the actual geographical position of the local energy system 30. At the moveable device 10 an operator or a navigational computer can then decide how to travel to the local energy system 30. The movable device 10 may be configured to calculate navigational data based on the position of the local energy system 30 and a current position of the moveable device 10.

The control circuit 44 and/or the selected moveable device 10 may execute a guiding function 58. The guiding function 58 is configured to determine geographical data pertaining to the geographical position of the local energy system 30 and/or of the selected moveable device 10 and use these to determine navigational data. The navigational data may comprise instructions for the selected moveable device 10 to reach the local energy system 30. The navigational data may then be sent to the moveable device 10 by the instructing function 56. The geographical position may be determined by GPS for the moveable device 10 and/or the local energy system 30. The geographical position may be pre-determined for the local energy system 30 and stored in the database 49. The moveable device 10 may be directed by sending said navigational data to a navigator of the moveable device 10.

As mentioned above, the control information associated to the local energy system 30 is information pertaining how to control the selected moveable device 10 in connection with the local energy system 30. The control information may be information pertaining to how to charge/discharge energy to/from the accumulator 20 of the selected moveable device 10 from/to the local energy system 30. The control information may be information pertaining to controlling of a charger/discharger configured to control charging/discharging of energy to from a movable device 10 connected to the local energy system 30. The charger/discharger may be arranged at the moveable device 10. The charger/discharger may be arranged at the local energy system 30.

For example, upon the selected moveable device 10 is already connected to the local energy system 30 or has arrived at the local energy system 30 and just being connected to the local energy system 30, the control information may be sent to the moveable device 10. Hence, the control information may be sent to the moveable device 10 upon connection of the moveable device 10 to the local energy system 30. Alternatively, or in connection, control information may be sent to a charger/discharger at the local energy system upon connection of the moveable device 10 to the local energy system 30. The charger/discharger, either arranged at the local energy system 30 or at the moveable device 10, is configured to control charging/discharging of energy to from a movable device 10 connected to the local energy system 30.

Hence, the server 40 may communicate with a local energy system, and with a plurality of moveable devices 10 comprising an on-board accumulator 20. The server 40 determines information associated to accumulator status of the accumulator 20 of each of the plurality of moveable devices 10. The accumulator status may pertain to a need of charging the accumulator or if the accumulator may be discharged, i.e. giving away energy. The server 40 further determines information associated to energy status for the local energy system 30. The energy status may pertain to excess or deficit of energy at the local energy system 30. The server 40 may then match the accumulator statuses of the respective moveable device 10 toward the energy status of the local energy system 30, i.e. the needs of the different moveable devices, to a specific moveable device 10 need energy or may it get rid of energy. By the matching a set, i.e. one or more, of the moveable devices need fulfilling the local energy system need may be determined. The navigational information associated to the local energy system 30 and/or the control information associated to the local energy system 30 may then be sent to one or more moveable devices 10 selected from the one or more determined moveable devices 10. Hence, one or more moveable devices 10 may be routed to a local energy system 30 having needs corresponding to the needs of the one or more moveable devices 10.

Details of the matching procedures and example embodiments of energy needs are described below.

The data pertaining to the respective moveable device 30 may indicate that out of the plurality of moveable devices 10A, 10B, 10C, the moveable device 30A has a surplus of energy. In this example, the accumulator 20 of the moveable device 30A is fully charged. The moveable device 10B may store more energy or may get rid of some its stored energy, depending on the needs of the moveable device 10B in the near future. The moveable device 10C has a deficit of energy, and will soon be out of energy.

According to a first example, the data pertaining to the local energy system 30 may indicate that the local energy system 30 is in need for energy. For example, energy production at the local energy system 30 may be less than a current energy demand at the local energy system 30. The scoring of the scoring function 54 may, according to this example, score the moveable device 10A highly, 10B not as highly and 10C the lowest. For example, a scale from 1-10 may be used wherein the moveable device 10A will score a 10, the moveable device 10B will score a 6 and moveable device 10C will score a 1.

On the other hand, the accumulator data may indicate that the local energy system 30 has a surplus of energy. For example, energy production at the local energy system 30 is larger than a current energy outtake at the local energy system 30. In this case, the moveable device 10C would be scored highly, the moveable device 10B would again be scored in the middle, and the moveable device 10A would be scored the lowest. For example, a scale from 1-10 may be used wherein the moveable device 10C will score a 10, the moveable device 10B will score a 5 and the moveable device 10A will score a 1.

As mentioned above, the accumulator data pertaining to the respective moveable device 30 may comprise a geographical area the moveable device 10 request to park on. If the case is that the moveable devices 10B and 10C are the only moveable devices 10 that are set to be parked at the geographical area wherein the local energy system 30 is comprised it is only moveable devices 10B and 10C that are being scored on the 1-10 scale. In such a case the moveable device 10A may receive a score of 0 since the local energy system 30 is not located within the geographical area wherein the moveable device 10A is planning to park. It is of course possible to think of many parameters or desirability for a local energy system 30 or moveable device 10, which the scoring of the scoring function 54 would use to score the moveable devices 10. One such parameter could for example simply be a preference of solar power over wind power, or renewable power over fossil fuel based power. Another parameter may e.g. be an indication whether the accumulator 20 of a specific moveable devoice 10 is allowed to be discharged, and in that case, possibly also an indication about how much discharge that is allowed, for example down to a SOC of 60%.

As seen from these examples, it is possible to direct one or more of the plurality of moveable devices 10 with an on board accumulator 20 to the local energy system 30 based on the respective needs of the moveable devices 10 in relation to needs of the local energy system 30.

It is possible for each of the moveable devices 10 to have set an interval of desired SOC, e.g. 30%-70% or 20%-50%. If this is done, the scoring function 54 may make a more informed selection of which moveable device 10 to select. For example: the local energy system 30 is in need of getting rid of energy. Then the moveable device 10 having the largest difference between its current SOC and its highest desired SOC, e.g. measured in kWh, may be scored the highest. According to another example, the local energy system 30 is in need of energy. Then the moveable device 10 having the largest difference between its current SOC and its lowest desired SOC, e.g. measured in kWh, may be scored the highest. Other factors may also of course come into play.

Figure 3:
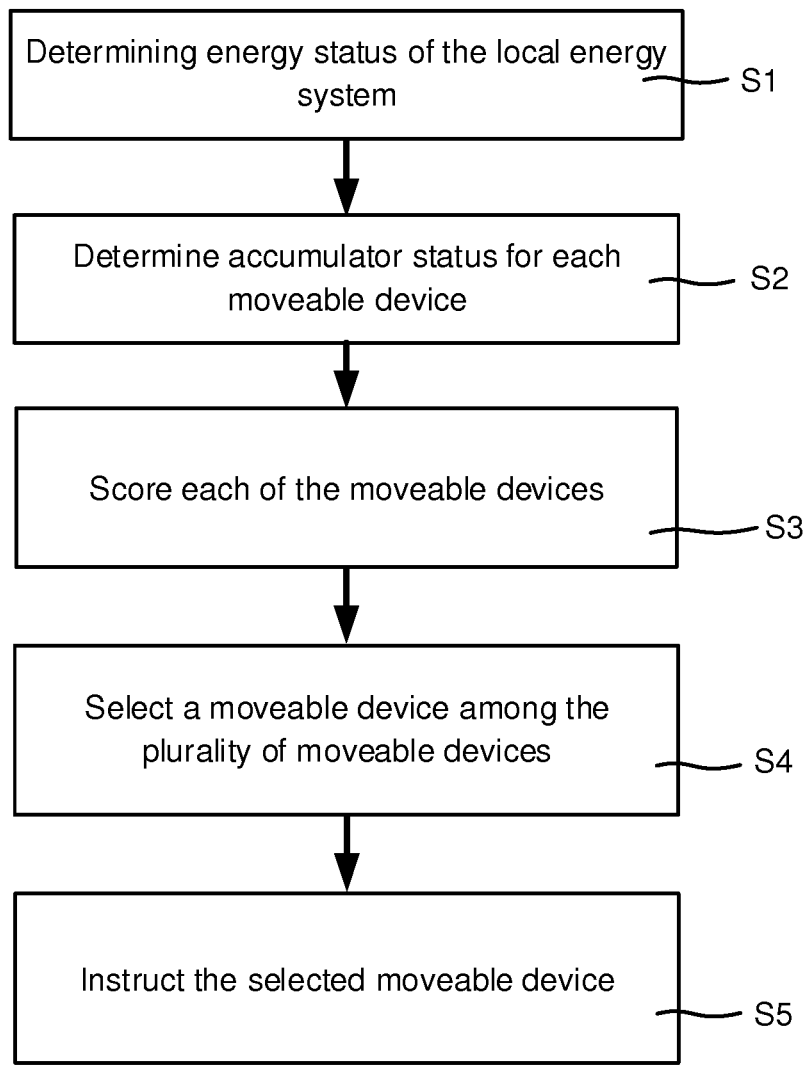
FIG. 3 is a flow diagram of a method for directing a moveable device to a local energy system.

FIG. 3 illustrates a flowchart of a method for handling surplus or deficit of energy in a local energy system 30. The acts of the method may be performed by the functions of the server 40 described above. However, it is equally realized that some or all of the act of the method may be performed by similar functions performed at other devices. The method comprising the following acts. Determining S1 an energy status of the local energy system 30. The accumulator status is determined based on data pertaining to the local energy system 30. The determining S1 may involve pre-determined data pertaining to the local energy system 30. Hence, data that is known beforehand. The determining S1 may involve measured or estimated data pertaining to the local energy system 30. Hence, data that is changing over time. Examples of data pertaining to the local energy system 30 are listed above. For example, the data pertaining to the local energy system 30 may pertain to an amount of energy available for transfer to an accumulator 20 of a movable device 10 from the local energy system 30. Further, the data pertaining to the local energy system 30 may pertain to an energy need of the local energy system 30. The data pertaining to the local energy system 30 may pertain to a time period of availability of the energy. The method further comprises determining S2 an accumulator status of each of a plurality of moveable devices 10 comprising an accumulator 20. The energy status of each of the moveable devices is based on accumulator data pertaining to an accumulator 20 of the respective moveable device 10. The determining S2 may involve pre-determined data pertaining to the respective moveable device 10. Hence, data that is known beforehand. The determining S2 may involve measured or estimated data pertaining to the respective moveable device 10. Hence, data that is changing over time. Examples of data pertaining to the respective moveable device 10 are listed above. For example, the data pertaining to each respective moveable device 10 may comprise a current state of charge of the accumulator 20 of the moveable device 10 and/or a maximum state of charge of the accumulator 20 of the moveable device 10. Further, the data pertaining to a moveable device 10 may comprise a desired state of charge of the accumulator 20 of the moveable device 10. The desired state of charge may comprise an interval of states of charge. The method further comprises scoring S3 each of the moveable devices 10. The scoring is based on the determined accumulator status for each of the moveable devices 10 and the determined energy status for the local energy system 30. The act of scoring S3 each of the moveable devices 10 may comprise estimating an energy cost for moving the movable device 10 to the local energy system 30. The act of moving the moveable device refers to transporting the moveable device to the respective local energy system. The act of moving may comprise one or more of driving, flying, propelling, or any other active way of transporting the moveable device to the respective local energy system. The data pertaining to an accumulator 20 may comprise a desired time of operation of the moveable device 10 comprising the accumulator 20. The desired time of operation may comprise a start time of the time of operation. The desired time of operation may comprise an end time of the time of operation. The start time of operation may be expressed as a departure time from the local energy system 30. For example, for a moveable device 10, which is a surveillance drone, available energy from the local energy system 30 may be weighed against the time when it expects to make its rounds.

The scoring will result in a score for each of the plurality of moveable devises 10. The score may e.g. be on a scale from 1-10. The method further comprises selecting S4 a moveable device 10, among the plurality of moveable devices 10, to which at least one of control information or navigational information associated to the local energy system 30 is to be sent. The selecting S4 is based on the respective scores of each of the plurality of moveable devices 10. For example, the selecting S4 may be made by selecting the moveable device 10 having the highest score. The selecting S4 may be made by selecting a moveable device 10 having a score above a threshold. The method further comprises instructing S5 the selected moveable device 10 by sending the control information and/or the navigational information associated to the local energy system 30 to the selected moveable device 10.

The method may further comprise identifying the plurality of moveable devices 10 as being moveable devices being presently located within a predetermined geographical area.

The method may further comprise setting a geographical area to within which the movable device 10 is planning to move and determining the plurality of local energy systems 30 to be scored based on the geographical area and the geographical locations of the local energy systems 30.

The person skilled in the art realizes that the present invention by no means is limited to the preferred embodiments described above. On the contrary, many modifications and variations are possible within the scope of the appended claims.

For example, the moveable device 10 may for instance be something other than an electric vehicle, such as a small flying drone, an exo-skeleton or a submarine—it is possible to use any moveable device with an accumulator.

The movable device may be autonomous.

In some embodiments a main task of the movable device is to be a movable accumulator for balancing excess and deficit of energy in local energy systems within a certain geographical area. An example of such a moveable device may be a vehicle comprising an accumulator in the form of a tank filled with a fluid. Energy may be stored in the fluid by heating the fluid. According to a non-limiting example, the fluid may be water or water mixed with an anti-freezing agent such as glycol. By this a simple and effective way for balancing excess and deficit of energy in thermal energy based local energy systems is provided.

Additionally, variations to the disclosed embodiments can be understood and effected by the skilled person in practicing the claimed invention, from a study of the drawings, the disclosure, and the appended claims.

The invention claimed is:

1. A method for handling surplus or deficit of energy in a local energy system, the method comprising:

determining an energy status of the local energy system, wherein the energy status comprises an excess amount of energy available for transfer from the local energy system together with a time period of availability of the energy and/or an energy need of the local energy system together with a time period of the need of the energy;

determining, for each of a plurality of moveable devices comprising an accumulator, an accumulator status, wherein the accumulator status for each moveable device comprises a current state of charge of the respective accumulator together with a desired state of charge of the accumulator, the desired state of charge comprising an interval of states of charge;

scoring, based on the determined respective accumulator status and the determined energy status, each of the moveable devices, wherein the scoring is configured to compare the energy status of the local energy system and the accumulator statuses of the moveable devices, and wherein scoring each of the moveable devices comprises estimating an energy cost associated with an amount of energy used for moving the moveable device to the local energy system;

selecting, based on the respective scores of each of the plurality of moveable devices, a moveable device among the plurality of moveable devices to which at least one of control information or navigational information associated to the local energy system is to be sent; and sending the control information and/or the navigational information to the selected moveable device.

2. The method according to claim 1, wherein the data pertaining to an accumulator comprises a desired time of operation of the moveable device comprising the accumulator, wherein the desired time of operation comprises at least one of a start time of the time of operation and an end time of the time of operation.

3. The method according to claim 1, wherein the local energy system comprises one or more of the following: a solar panel, a wind turbine, a thermal energy generator.

4. The method according to claim 1, wherein the local energy system comprises another moveable device comprising an accumulator.

5. The method according to claim 1, wherein the local energy system comprises one or more of a district heating system or a district cooling system.

6. The method according to claim 1, wherein the local energy system comprises a shared heating and cooling thermal system.

7. The method according to claim 1, further comprising identifying the plurality of moveable devices as being moveable devices being presently located within a predetermined geographical area.

8. The method according to claim 1, wherein the act of selecting comprises selecting a moveable device among the plurality of moveable devices to which control information associated to the local energy system is to be sent, and the act of sending comprises sending the control information to the selected moveable device.

9. The method according to claim 8, wherein the local energy system is another moveable device and wherein the selected moveable device is selected to be a moveable device connected to the local energy system.

10. A server configured to handle surplus or deficit of energy in a local energy system, the server comprising:
a receiver configured to receive an excess amount of energy available for transfer from a local energy system together with a time period of availability of the energy and/or an amount of energy needed at the local energy system together with a time period of the need of the energy, and to receive a current state of charge together with an interval of desired state of charge for each of a plurality of accumulators, each accumulator belonging to a different one of a plurality of moveable devices, and a control circuit configured to:
determine, using a local energy system status determining function, an energy status of the local energy system, wherein the energy status comprises an excess amount of energy available for transfer from the local energy system together with a time period of availability of the energy and/or an amount of energy needed at the local energy system together with a time period of the need of the energy;
determine, using an accumulator determining function, an accumulator status for each of the moveable devices, wherein the accumulator status for each moveable device comprises a current state of charge together with an interval of desired state of charge;
score, using a scoring function, each of the moveable devices, wherein each score is a comparison of the energy status of the local energy system and the respective accumulator status of the moveable device, and wherein scoring each of the moveable devices comprises estimating an energy cost associated with an amount of energy used for moving the moveable device to the local energy system; and
select, using the scoring function, a moveable device among the plurality of moveable devices to which at least one of control information or navigational information associated to the local energy system is to be sent;
wherein the receiver is further configured to send the control information and/or navigational information associated to the local energy system to the selected moveable device.

* * * * *